United States Patent [19]

Yumiba et al.

[11] Patent Number: 5,483,359
[45] Date of Patent: Jan. 9, 1996

[54] COLOR IMAGE SCANNING APPARATUS FOR READING A COLOR ORIGINAL WITHOUT COLOR SHIFT REGARDLESS OF A MAGNIFICATION RATIO OF THE ORIGINAL

[75] Inventors: Takashi Yumiba, Osaka; Shinichi Konishi, Hirakata; Shinichiro Takigawa, Tsuzuki, all of Japan

[73] Assignee: Matsuhita Electric Industrial Co., Ltd., Kadoma, Japan

[21] Appl. No.: 320,045

[22] Filed: Oct. 7, 1994

[30] Foreign Application Priority Data

Oct. 12, 1993 [JP] Japan .................................. 5-254169

[51] Int. Cl.[6] ...................................................... H04N 1/19
[52] U.S. Cl. ............................................. 358/513; 358/514
[58] Field of Search ........................... 358/500, 512–514, 358/412, 474, 482, 483, 494; 355/326 R; 250/208.1; H04N 1/17, 1/19, 1/46

[56] References Cited

U.S. PATENT DOCUMENTS

| | | | |
|---|---|---|---|
| 4,736,251 | 4/1988 | Sasaoka ................................. | 358/513 |
| 4,985,760 | 1/1991 | Maeshima et al. ..................... | 358/514 |
| 4,987,485 | 1/1991 | Hirota .................................... | 358/80 |
| 5,361,145 | 11/1994 | Hasegawa .............................. | 358/514 |

FOREIGN PATENT DOCUMENTS

| | | |
|---|---|---|
| 1109966 | 4/1989 | Japan . |
| 4266261 | 9/1992 | Japan . |
| 522520 | 1/1993 | Japan . |

*Primary Examiner*—Edward L. Coles, Sr.
*Assistant Examiner*—Kim Yen Vu
*Attorney, Agent, or Firm*—Renner, Otto, Boisselle & Sklar

[57] ABSTRACT

A color image scanning apparatus is disclosed which includes: an image sensor for scanning an original, the image sensor including a plurality of line sensors arranged in a sub-scanning direction; a determination circuit for determining the traveling speed of the image sensor in the sub-scanning direction in accordance with a magnification ratio of the original; a driving circuit for moving the image sensor in the sub-scanning direction at the speed determined by the determination circuit; a correction circuit for correcting the output of the image sensor to simultaneously output signals corresponding to an identical position of the original; a filter for filtering the output of the correction circuit in accordance with the magnification ratio of the original and the speed determined by the determination circuit, wherein the determination circuit determines the speed so that each distance of the plurality of line sensors arranged in the sub-scanning direction is substantially equal to an integral multiple of a traveling pitch per line at which the image sensor travels in the sub-scanning direction.

4 Claims, 9 Drawing Sheets

COLOR IMAGE SCANNING APPARATUS FOR READING A COLOR ORIGINAL WITHOUT COLOR SHIFT REGARDLESS OF A MAGNIFICATION RATIO OF THE ORIGINAL

BACKGROUND OF THE INVENTION

1. Field of the Invention

The present invention relates to a color image scanning apparatus equipped with a color image sensor including a plurality of line sensors arranged in a sub-scanning direction.

2. Description of the Related Art

In recent years, the commercialization of equipment dealing with a color image has been rapidly advanced with the enhancement of performance of computers and the increment of capacity of memories thereof. In particular, color image scanners for inputting a color static image into a computer have been actively commercialized.

In such color image scanners, image sensors of an on-chip filter system in which color separation filters are provided on a sensor chip have been extensively used because of their properties such as high speed and simplified construction.

Generally, in document reading devices, the enlargement/reduction of images to be read along a main scanning direction is achieved by electrical processing, and the enlargement/reduction of images to be read along a sub-scanning direction is achieved by varying the traveling speed of the image sensor in accordance with the magnification ratio with fixing a drive timing of the image sensors.

However, for example, a line sequential color image sensor, in which image sensors are arranged in three rows in the sub-scanning direction and a color separation filter is provided in each row is used, has problems. That is, in such a line sequential color image sensor, the difference from the time when the color data is previously read to the time when the color data is subsequently read varies depending upon the magnification ratio, so that a color shift cannot be prevented unless the time difference is an integral multiple of the main scanning time.

In order to overcome the above-mentioned problems, Japanese Laid-Open Patent Publication No. 1-109966 has proposed a technique for driving line sensors arranged in parallel at the identical timing and obtaining a signal read from apparently the same position by using interpolating means for performing interpolation of image signals from a plurality of lines in accordance with the magnification ratio and the distance between the respective line sensors.

However, even in the above-mentioned construction, there still remain problems to be solved. That is, the color shift caused by the variation of the sub-scanning traveling speed in accordance with the designated magnification ratio can be reduced by interpolation; however, the color shift cannot be completely eliminated since pixels placed at the identical position in the main scanning direction of each row do not read the identical position of the original.

In addition, it is required to perform interpolation during a period of the output corresponding to one pixel, and the construction of the image sensor becomes more difficult with the increment of speed. Furthermore, since the moving distance of line sensors varies depending upon the magnification ratio of the original, coefficients used for linear operation are different, thereby causing the demand for a high-speed multiplier.

SUMMARY OF THE INVENTION

The color image scanning apparatus of this invention, comprises:

an image sensor for scanning an original, the image sensor including a plurality of line sensors arranged in a sub-scanning direction;

determination means for determining speed for traveling the image sensor in the sub-scanning direction in accordance with a magnification ratio of the original;

driving means for driving the image sensor in the sub-scanning direction at the speed determined by the determination means;

correction means for correcting an output of the image sensor to simultaneously output signals corresponding to an identical position of the original;

filtering means for filtering the output of the correction means in accordance with the magnification ratio of the original and the speed determined by the determination means, wherein the determination means determines the speed so that each distance of the plurality of line sensors arranged in the sub-scanning direction is substantially equal to an integral multiple of a traveling pitch per line at which the image sensor travels in the sub-scanning direction.

In one embodiment of the present invention, the determination means determines the speed so as to satisfy the relationship: $\frac{1}{2}P \leq M \leq \frac{2}{3}P$, where resolution corresponding to the magnification ratio of the original is M and resolution corresponding to the speed determined by the determination means is P.

In another embodiment of the present invention, the filtering means comprises:

storing means for storing data corresponding to one line;

calculating means for calculating per pixel an average value between data corresponding to a current line and data corresponding to one line before the current line; and selection means for selecting one of an output of the calculating means and the data corresponding to the current line.

In still another embodiment of the present invention, the plurality of line sensors are formed on one chip, and color separation filters are respectively formed on the plurality of line sensors.

According to the present invention, the sub-scanning traveling pitch is determined so that each distance between a plurality of line sensors arranged in the sub-scanning direction is substantially equal to an integral multiple of a moving pitch per line at which a color image sensor moves in the sub-scanning direction. Because of this, regardless of the magnification ratio of the original, each line sensor can read the identical position of the original with a time delay of the integral multiple of the main scanning time. As a result, an image without any color shift can be obtained. Furthermore, the output of the color image sensor is subjected to filtering at an appropriate rate in accordance with the magnification ratio of the original and the sub-scanning speed. Because of this, an image with desired resolution can be obtained without any lack of information. Thus, according to the present invention, a satisfactory image without any color shift and lack of information can be obtained, resulting in great effects for practical use.

Thus, the invention described herein makes possible the advantage of providing a color image scanning apparatus enabling an image without any color shift with its simplified construction.

This and other advantages of the present invention will become apparent to those skilled in the art upon reading and understanding the following detailed description with reference to the accompanying figures.

DESCRIPTION OF THE PREFERRED EMBODIMENTS

Figure 1:
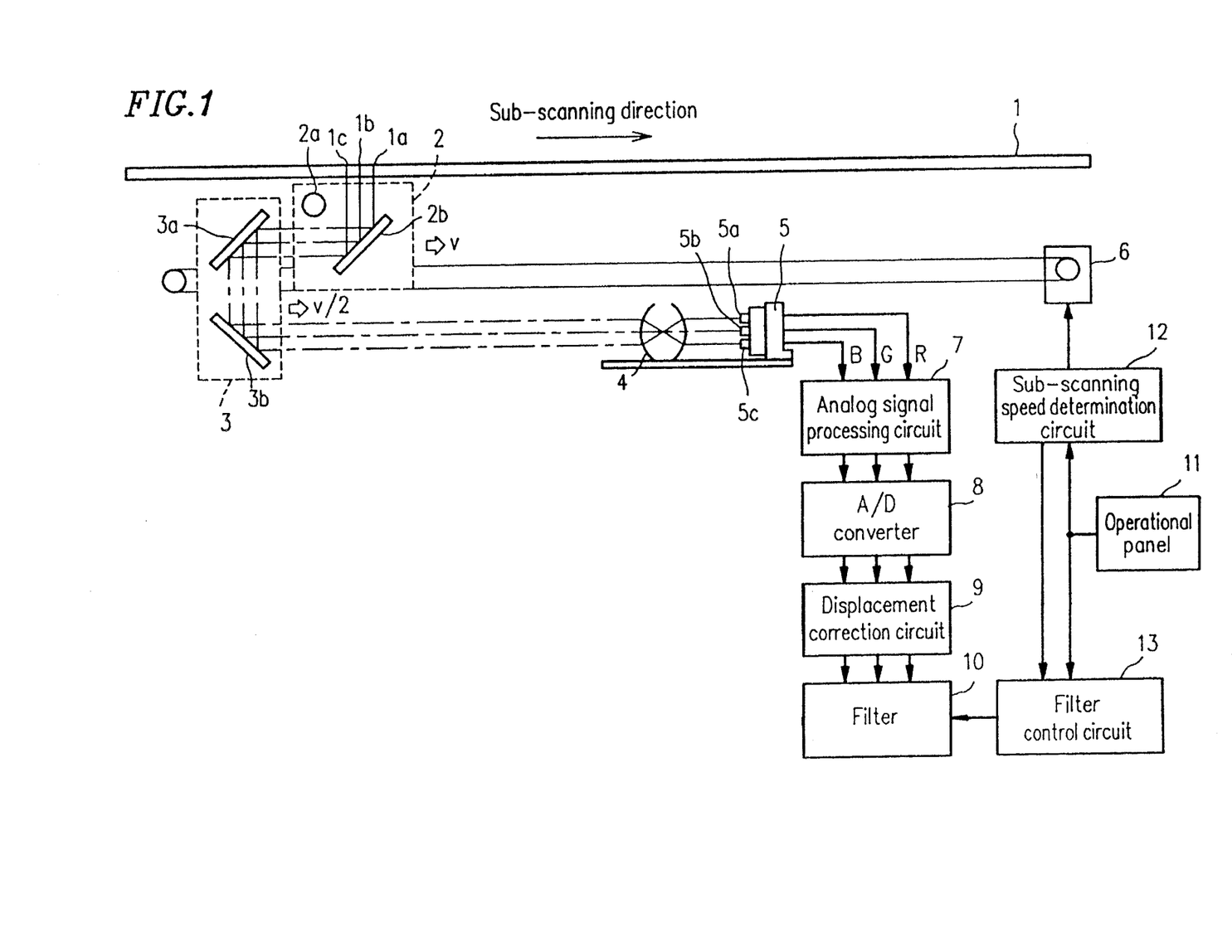
FIG. 1 is a diagram showing the construction of the first example of a color image scanning apparatus according to the present invention.

FIG. 1 shows the construction of the first example of a color image scanning apparatus according to the present invention. The color image scanning apparatus includes a document glass 1 for placing an original document to be scanned thereon, an optical system for directing light reflected from the original to a color image sensor 5, a driving circuit 6 for driving the optical system in a sub-scanning direction, and a color image sensor 5 for converting light reflected from the original into an electric signal. The optical system includes an optical system 2 driven by the driving circuit 6 in the sub-scanning direction at speed V, an optical system 3 driven by the driving circuit 6 in the sub-scanning direction at speed V/2, and an imaging lens 4. The reason for driving the optical systems 2 and 3 at such different speeds is to retain an optical path from a reading position of the original to the color image sensor 5 at a constant length regardless of the reading position of the original. Because of this, the light reflected from the original is always focused on the color image sensor 5 regardless of the reading position of the original.

The optical system 2 includes a light source 2a for illuminating the original and a reflective mirror 2b. The optical system 3 includes reflective mirrors 3a and 3b. The light reflected from a line 1a of the original is incident upon an R sensor 5a of the color image sensor 5 through the reflective mirrors 2b, 3a, and 3b and the imaging lens 4. The light reflected from a line 1b of the original is incident upon a G sensor 5b of the color image sensor 5 through the reflective mirrors 2b, 3a, and 3b and the imaging lens 4. The light reflected from a line 1c of the original is incident upon a B sensor 5c of the color image sensor 5 through the reflective mirrors 2b, 3a, and 3b and the imaging lens 4. However, it is understood by those skilled in the art that it is not essential to the present invention which path the light reflected from a line of the original passes through to be incident upon the color image sensor 5. Thus, the present invention is not limited to the construction of the optical system shown in FIG. 1.

Figure 2:
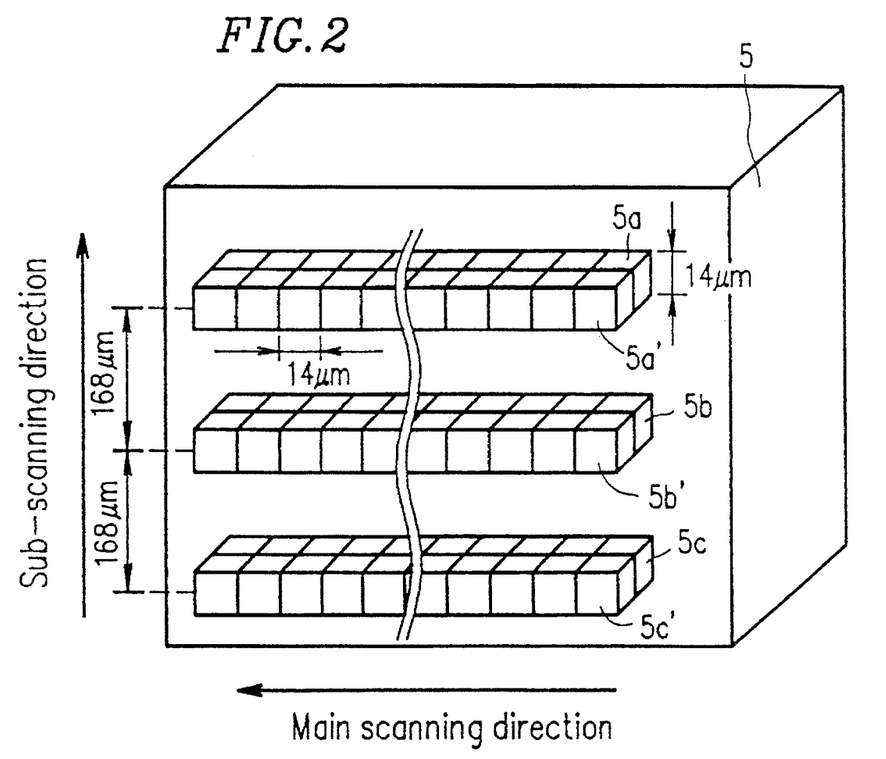
FIG. 2 is a diagram showing the construction of a color image sensor of the first example according to the present invention.

FIG. 2 shows the construction of the color image sensor 5. The color image sensor 5 includes the R sensor 5a, the G sensor 5b, and the B sensor 5c. The R sensor 5a, the G sensor 5b, and the B sensor 5c are line sensors respectively extending in a main scanning direction and arranged in three rows in the sub-scanning direction. On the R sensor 5a, an R filter 5a' is formed to pass only an R component of the incident light. As a result, the R sensor 5a converts the R component of the light reflected from the line 1a of the original into an electric signal (R signal). On the G sensor 5b, a G filter 5b' is formed to pass only a G component of the incident light. As a result, the G sensor 5b converts the G component of the light reflected from the line 1b of the original into an electric signal (G signal). On the B sensor 5c, a B filter 5c' is formed to pass only a B component of the incident light. As a result, the B sensor 5c converts the B component of the light reflected from the line 1c of the original into an electric signal (B signal). Thus, the R, G, and B signals simultaneously output from the R, G, and B sensors 5a, 5b, and 5c correspond to the different lines 1a, 1b, and 1c of the original. Accordingly, in order to obtain R, G, and B signals corresponding to the identical line of the original, it is required to correct a displacement in the sub-scanning direction among the R sensor 5a, the G sensor 5b, and the B sensor 5c by delaying the R signal by a period T1 with respect to the B signal and delaying the G signal by a period T2 with respect to the B signal. Such a correction can be realized by a displacement correction circuit 9 described later. It is noted that the periods T1 and T2 are varied depending upon the magnification ratio of the original.

Hereinafter, it is assumed in the present example that the size of a pixel in the color image sensor 5 is 14 μm×14 μm, the distance between the R sensor 5a and the G sensor 5b is 168 μm, and the distance between the G sensor 5b and the B sensor 5c is 168 μm. It is also assumed that in the case where the magnification ratio of the original is 100% (that is, equal magnification), the distance between the respective line sensors corresponds to 12 lines, and the resolution of the color image scanning apparatus is 400 dpi. It should be understood that the present invention is not limited to these specific numerical values. In the on-chip filter system, each line sensor is formed on one chip.

As is apparent from FIG. 1, the color image sensor 5 is fixed at a predetermined position of the color image scanning apparatus. However, the movement of the optical system 2 in the sub-scanning direction means the "virtual" movement of the color image sensor 5 in the sub-scanning direction along the document glass 1.

Figure 3A:
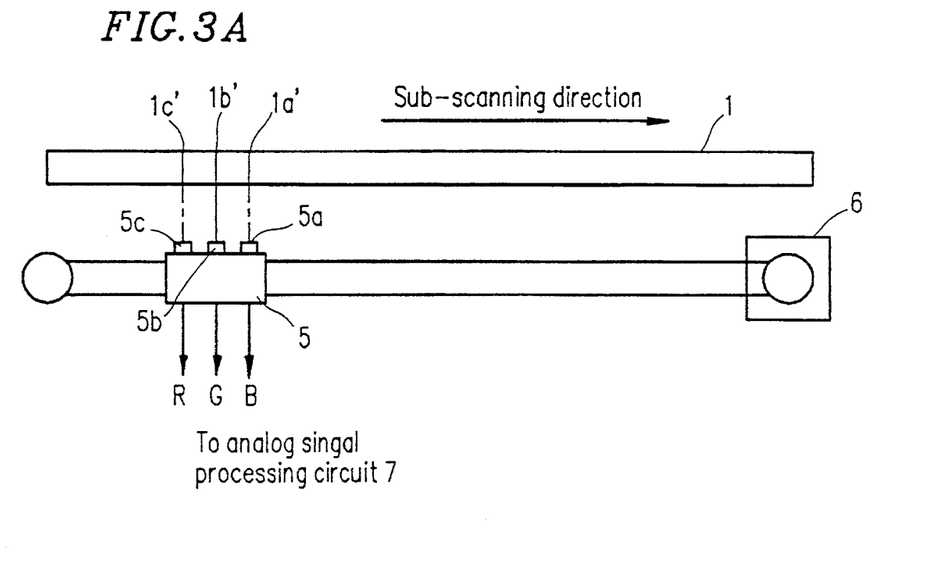
FIG. 3A is a diagram showing the color image sensor which "virtually" moves in a sub-scanning direction.

FIG. 3A shows how the color image sensor 5 "virtually" moves in the sub-scanning direction along the document glass 1. The lights reflected from the lines 1a', 1b' and 1c' of the original are respectively incident upon the R sensor 5a, the G sensor 5b, and the B sensor 5c of the color image sensor 5. However, it should be noted that the scale of the movement of the optical system 2 in the sub-scanning direction is different from that of the "virtual" movement of the color image sensor 5 in the sub-scanning direction. The reason for this is that the scale in the sub-scanning direction is changed by the imaging lens 4. For example, the movement of the optical system 2 by 63.50 μm in the sub-scanning direction is equivalent to the "virtual" movement of the color image sensor 5 by 14.00 μm in the sub-scanning direction. Furthermore, the distance in which the optical system 2 actually moves in the sub-scanning direction is in proportion with the distance in which the color image sensor 5 "virtually" moves in the sub-scanning direction.

Next, the principle of the present invention will be described with reference to FIG. 3B. Hereinafter, in the present specification, the "virtual" movement of the color image sensor 5 in the sub-scanning direction in the above-mentioned sense is merely referred to as "the movement of the color image sensor 5 in the sub-scanning direction".

It is assumed that the distance between the R sensor 5a and the G sensor 5b and the distance between the G sensor 5b and the B sensor 5c are respectively $d_1$. It is also assumed that the moving pitch per line in the case where the color image sensor 5 moves in the sub-scanning direction is $d_2$.

Figure 3B:
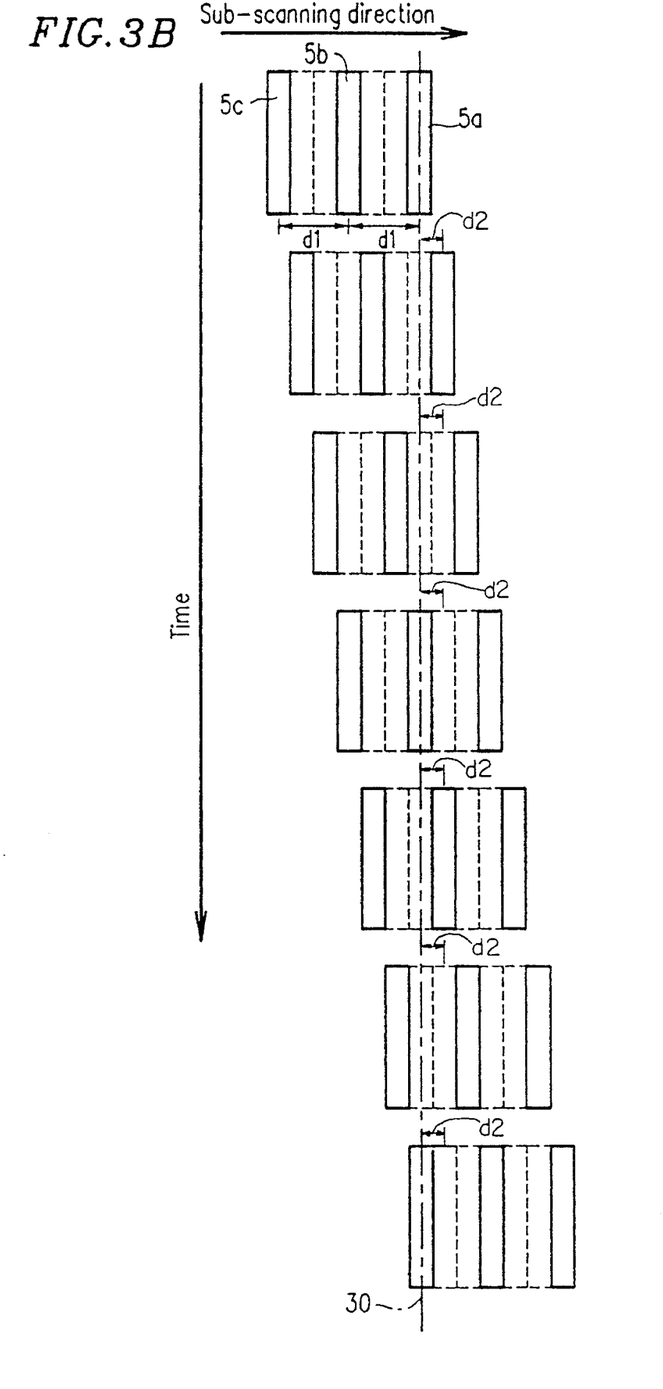
FIG. 3B is a diagram illustrating a principle according to the present invention.

FIG. 3B shows the movement of the color image sensor 5 in the sub-scanning direction with a time sequence, where $d_1/d_2=3$. In the case where $d_1$ is equal to an integral multiple of $d_2$, the position of the original at which the R sensor 5a currently scans is exactly matched with that of the original at which the G sensor 5b is to scan after scanning a $(d_1/d_2)$ line, and is exactly matched with that of the original at which the B sensor 5c is to scan after scanning a $(d_1/d_2 \times 2)$ line. Thus, if a circuit for delaying the R signal and the G signal by required number of lines is provided, the R, G, and B signals corresponding to the identical position of the original can be simultaneously output. This results in the prevention of the occurrence of a color shift caused by a shift of output timings of the R, G, and B signals.

However, $d_2$ is the amount to be changed depending upon the magnification ratio of the original. Accordingly, it is impossible for all of the values to be taken by the magnification ratio of the original to satisfy the relationship that $d_1$ is equal to an integral multiple of $d_2$. In the case where $d_1$ is not equal to the integral multiple of $d_2$, the R, G, and B signals corresponding to the identical position of the original cannot be simultaneously output. As a result, the output timings of the R, G, and B signals are shifted, leading to the color shift.

The color image scanning apparatus of the present invention is controlled so as to satisfy the relationship that $d_1$ is always equal to the integral multiple of $d_2$ regardless of the magnification ratio of the original. However, such a control results in the output of data with resolution different from desired resolution. In view of this, the color image scanning apparatus of the present invention includes a circuit for generating data having resolution higher than desired resolution so that the relationship that $d_1$ is equal to the integral multiple of $d_2$ is satisfied, and a circuit for outputting data having the desired resolution by filtering the data at an appropriate ratio. Because of this, the color shift and lack of information caused by the shift of the output timings of the R, G, and B signals do not occur, and data having arbitrary resolution can be output.

Referring back to FIG. 1, the color image scanning apparatus further includes an analog processing circuit 7, an analog/digital converter (A/D converter) 8, a displacement correction circuit 9, a filter 10, an operating panel 11, a sub-scanning speed determination circuit 12, and a filter control circuit 13. The analog processing circuit 7 amplifies the R, G, and B signals output from the color image sensor 5 and clamps them at a predetermined level. The A/D converter 8 converts each of the R, G, and B signals into a digital signal. The displacement correction circuit 9 corrects the displacement among the R sensor 5a, the G sensor 5b, and the B sensor 5c in the sub-scanning direction. The filter 10 filters the output of the displacement correction circuit 9 in accordance with a control signal from the filter control circuit 13. The operational panel 11 sets the magnification ratio of the original. The sub-scanning speed determination circuit 12 determines the speed at which the optical system 2 travels in the sub-scanning direction in accordance with the magnification ratio of the original set by the operational panel 11 and supplies a control signal indicating the speed to the driving circuit 6. The filter control circuit 13 controls the operation of the filter 10 in accordance with the magnification ratio of the original set by the operational panel 11 and the speed determined by the sub-scanning speed determination circuit 12.

The R, G, and B signals output from the color image sensor 5 are input to the displacement correction circuit 9 through the analog signal processing circuit 7 and the A/D converter 8.

Figure 4:
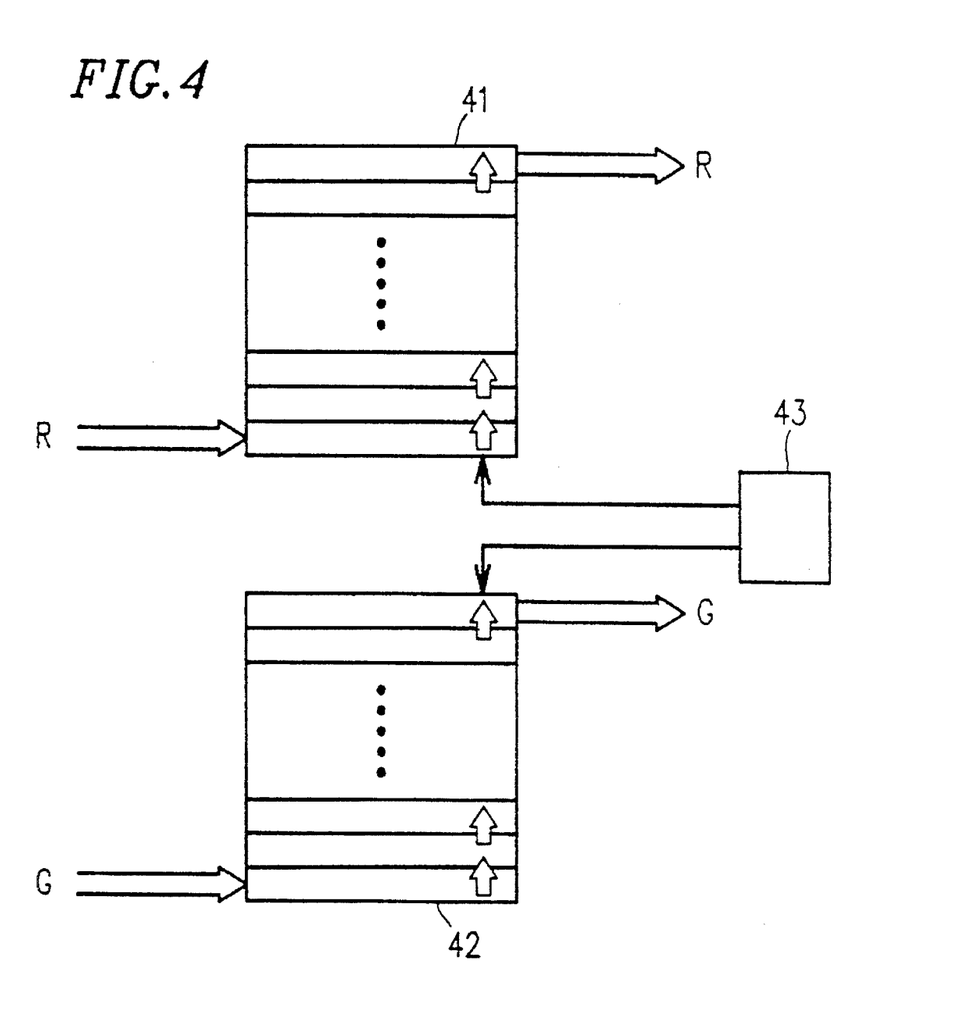
FIG. 4 is a diagram showing the configuration of a displacement correction circuit of the first example according to the present invention.

FIG. 4 shows the configuration of the displacement correction circuit 9. The displacement correction circuit 9 includes an R signal delay memory 41, a G signal delay memory 42, and a memory control circuit 43. The R signal delay memory 41 is an FIFO (First-in First-out) memory for storing the R signal corresponding to a plurality of lines. The G signal delay memory 42 is an FIFO memory for storing the G signal corresponding to a plurality of lines. The memory capacity required for the R signal delay memory 41 and the G signal delay memory 42 are designed in accordance with the acceptable range of the magnification ratio of the original. For example, in the case where the acceptable magnification ratio of the original is in the range of 50% to 200%, the R signal delay memory 41 may have a memory capacity corresponding to 48 lines, and the G signal delay memory 42 may have a memory capacity corresponding to 24 lines. The memory control circuit 43 controls the timing of the input to the FIFO memory and the timing of the output from the FIFO memory.

Figure 5:
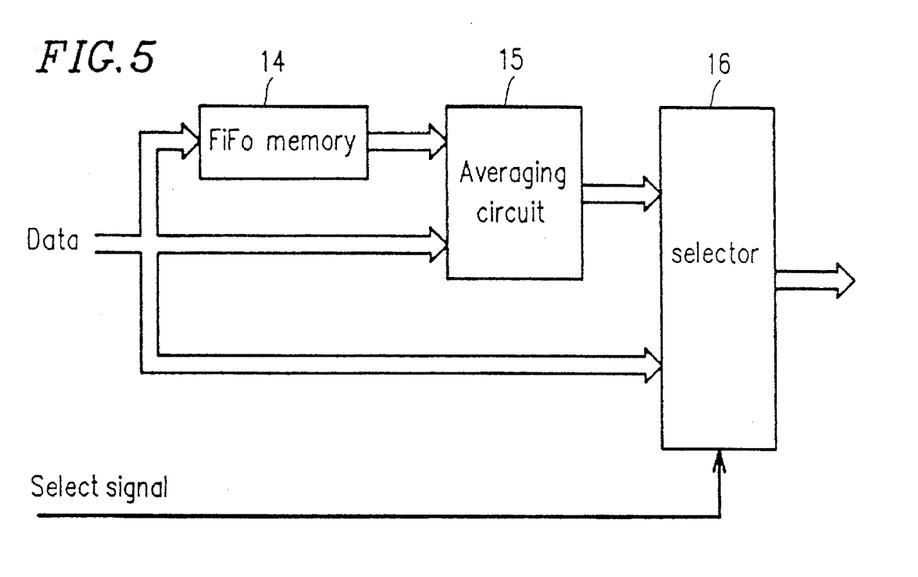
FIG. 5 is a diagram showing the configuration of a filter circuit of the first example according to the present invention.

FIG. 5 shows the configuration of a circuit for filtering out the R signal of the filter 10. The filter 10 includes a circuit for filtering out the R signal, a circuit for filtering out the G signal, and a circuit for filtering out the B signal. The configuration of the circuit for filtering out the G signal and the configuration of the circuit for filtering out the B signal are identical with that of the circuit shown in FIG. 5.

The circuit shown in FIG. 5 includes an FIFO memory 14, an averaging circuit 15, and a selector 16. The FIFO memory 14 stores data corresponding to one line. The averaging circuit 15 calculates per pixel an average value between data corresponding to a current line and data corresponding to a previous line stored in the FIFO memory 14. The selector 16 selects one of the output of the averaging circuit 15 and the data corresponding to the current line in accordance with a select signal. The select signal is supplied to the filter 10 by the filter control circuit 13.

The sub-scanning speed determination circuit 12 determines speed at which the optical system 2 travels in the sub-scanning direction in accordance with the magnification ratio of the original set by the operational panel 11. Hereinafter, for convenience of description, the speed at which the optical system 2 travels in the sub-scanning direction is represented by a pitch (sub-scanning traveling pitch) per line for traveling the optical system 2 in the sub-scanning direction.

Table 1 shows the relationship between the resolution corresponding to the magnification ratio of the original set by the operational panel 11 and the sub-scanning traveling pitch. The sub-scanning speed determination circuit 12 determines a sub-scanning traveling pitch so that the distance between the respective line sensors becomes substantially equal to the integral multiple of a pitch per line at which the color image sensor 5 moves in the sub-scanning direction. For example, in the case where the resolution corresponding to the magnification ratio of the original set by the operational panel 11 is in the range of 367 to 400 dpi, the sub-scanning speed determination circuit 12 determines the sub-scanning traveling pitch to be 63.50 μm. In this case, the sub-scanning traveling pitch determined by the sub-scanning speed determination circuit 12 corresponds to 400 dpi. Thus, in the case where the given resolution is in the range of 367 to 399 dpi, the resolution corresponding to the sub-scanning traveling pitch determined by the sub-scanning speed determination circuit 12 is higher than the given resolution.

and then input to the displacement correction circuit 9.

As described above, in the case where the magnification ratio of the original is 100%, the distance between the respective line sensors corresponds to 12 lines. Thus, the R, G, and B signals corresponding to the identical line of the original can be simultaneously output by delaying the R signal by 24 lines with respect to the B signal and by delaying the G signal by 12 lines with respect to the B signal. Such a delay can be accomplished by the R signal delay memory 41 and the G signal delay memory 42 of the displacement correction circuit 9.

Figure 6:
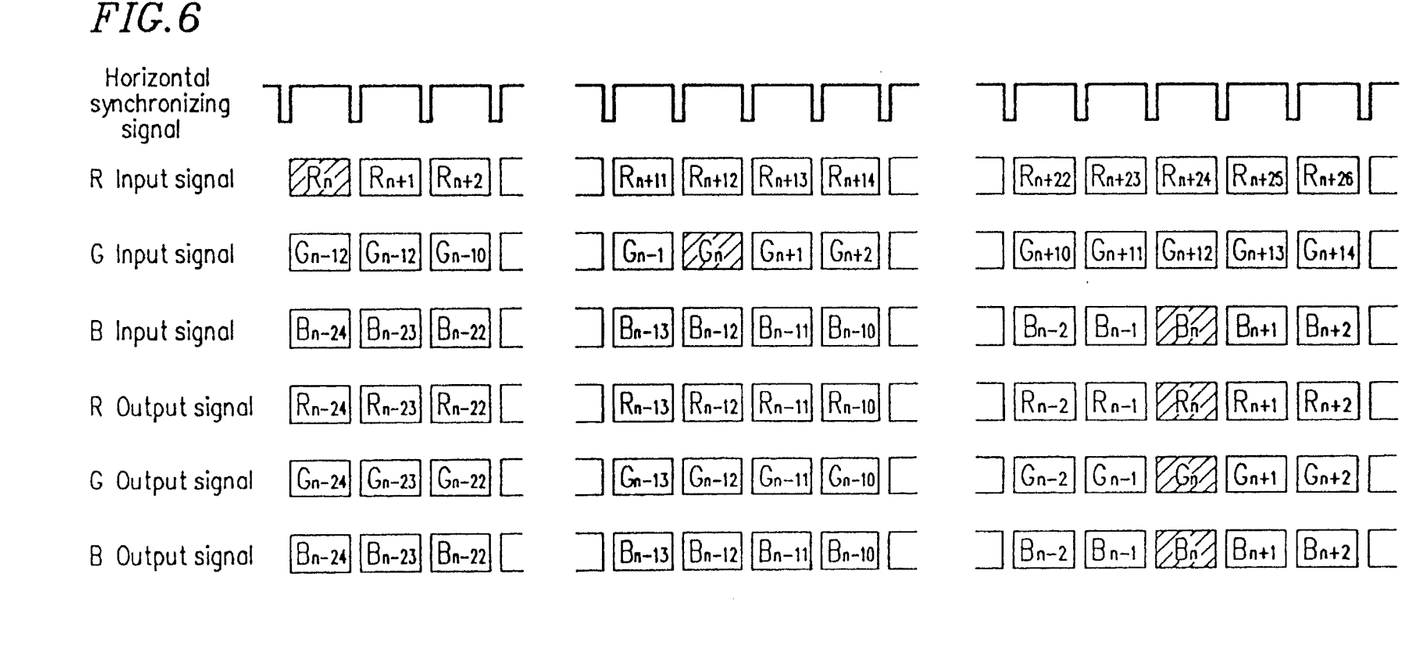
FIG. 6 is a diagram showing input/output timing of the displacement correction circuit of the first example according to the present invention.

FIG. 6 shows the relationship between the timing of the input to the displacement correction circuit 9 and the timing of the output from the displacement correction circuit 9 in the case where the magnification ratio of the original is 100%. In FIG. 6, signals corresponding to the identical line of the original are denoted by the identical reference numeral. For example, signals $R_n$, $G_n$, and $B_n$ respectively show signals corresponding to the nth line of the original. The signal $G_n$ is input to the displacement correction circuit

TABLE 1

| Resolution corresponding to a given magnification ratio (dpi) | Sub-scanning traveling pitch (μm) | Resolution corresponding to a sub-scanning traveling pitch (dpi) | Number of delay lines | |
|---|---|---|---|---|
| | | | Red | Green |
| 50 ~ 66 | 384.84 | 66 | 4 | 2 |
| 67 ~ 100 | 254.00 | 100 | 6 | 3 |
| 101 ~ 133 | 190.98 | 133 | 8 | 4 |
| 134 ~ 166 | 153.01 | 166 | 10 | 5 |
| 167 ~ 200 | 127.00 | 200 | 12 | 6 |
| 201 ~ 233 | 109.01 | 233 | 14 | 7 |
| 234 ~ 266 | 95.49 | 266 | 16 | 8 |
| 267 ~ 300 | 84.67 | 300 | 18 | 9 |
| 301 ~ 333 | 76.27 | 333 | 20 | 10 |
| 334 ~ 366 | 69.39 | 366 | 22 | 11 |
| 367 ~ 400 | 63.50 | 400 | 24 | 12 |
| 401 ~ 433 | 58.66 | 433 | 26 | 13 |
| 434 ~ 466 | 54.62 | 466 | 28 | 14 |
| 467 ~ 500 | 50.80 | 500 | 30 | 15 |
| 501 ~ 533 | 47.65 | 533 | 32 | 16 |
| 534 ~ 566 | 44.87 | 566 | 34 | 17 |
| 567 ~ 600 | 42.33 | 600 | 36 | 18 |
| 601 ~ 633 | 40.13 | 633 | 38 | 19 |
| 634 ~ 666 | 38.14 | 666 | 40 | 20 |
| 667 ~ 700 | 36.29 | 700 | 42 | 21 |
| 701 ~ 733 | 34.65 | 733 | 44 | 22 |
| 734 ~ 766 | 33.16 | 766 | 46 | 23 |
| 767 ~ 800 | 31.75 | 800 | 48 | 24 |

Hereinafter, the operation of the color image scanning apparatus according to the present invention in the case where the magnification ratio of the original is 100% will be described.

When the magnification ratio of the original is set at 100% by the operational panel 11, the sub-scanning speed determination circuit 12 determines the sub-scanning traveling pitch to be 63.50 μm so that the pixel density in the sub-scanning direction is 400 dpi and supplies a control signal indicating the sub-scanning traveling pitch to the driving circuit 6. For example, in the case where the driving circuit 6 is a stepping motor, the frequency of the stepping motor is set so that the optical system 2 moves in the sub-scanning direction at a speed of 63.50 μm/line. This corresponds to the fact that the color image sensor 5 moves in the sub-scanning direction at a speed of 14 μm/line. The R, G, and B signals output from the color image sensor 5 are amplified by the analog signal processing circuit 7, clamped at a predetermined level, converted by the A/D converter 8, 9 after a 12-cycle delay from the signal $R_n$. The signal $B_n$ is input to the displacement correction circuit 9 after a 24-cycle delay from the signal $R_n$. The displacement correction circuit 9 delays the signal $R_n$ by 24 cycles with respect to the signal $B_n$ and delays the signal $G_n$ by 12 cycles with respect to the signal $B_n$. As a result, the signals $R_n$, $G_n$, and $B_n$ are simultaneously output to the filter 10.

In the case where the magnification ratio of the original is 100%, the filter control circuit 13 always supplies a select signal for selecting data corresponding to the current line to the selector 16 of the filter 10. The reason for this is as follows: Since the resolution (400 dpi) corresponding to the magnification ratio of the original set by the operational panel 11 is matched with the resolution (400 dpi) corresponding to the sub-scanning traveling pitch determined by the sub-scanning speed determination circuit 12, when the filter 10 outputs data output from the displacement correction circuit 9, just the way it is, the filter 10 outputs data having the given resolution. It is not required for the filter 10 to filter out some data from the data output from the displacement correction circuit 9.

Next, the operation of the color image scanning apparatus according to the present invention in the case where the magnification ratio of the original is 70% will be described in detail.

In the case where the magnification ratio of the original is set at 70% by the operational panel 11, the resolution of data to be actually output becomes 280 dpi (=400 dip×0.7). In this case, the sub-scanning speed determination circuit 12 determines the sub-scanning traveling pitch to be 84.67 μm so that the pixel density in the sub-scanning direction becomes 300 dpi. A control signal indicating the sub-scanning traveling pitch determined by the sub-scanning speed determination circuit 12 is supplied to the driving circuit 6.

The reason for the sub-scanning speed determination circuit 12 to determine the sub-scanning traveling pitch corresponding to 300 dpi instead of 280 dpi is to make the distance between the respective line sensors substantially equal to the integral multiple of a pitch per line at which the color image sensor 5 travels in the sub-scanning direction, regardless of the given resolution. Because of this, the R, G, and B signals corresponding to the identical position of the original can be simultaneously output by delaying the R and G signals by a predetermined number of lines. The number of lines by which the R signal is delayed with respect to the B signal and the number of lines by which the G signal is delayed with respect to the B signal can be obtained by the following Equations, respectively.

$$168 \times 2 \div (14 \times 400 \div 300) = 18 \text{ (lines)}$$

$$168 \div (14 \times 400 \div 300) = 9 \text{ (lines)}$$

The displacement correction circuit 9 delays the R signal by 18 lines with respect to the B signal and delays the G signal by 9 lines with respect to the B signal. As a result, the R, G, and B signals corresponding to the identical line of the original are simultaneously output from the displacement correction circuit 9.

The data output from the displacement correction circuit 9 is data corresponding to 300 dpi. As described above, the resolution of data to be actually output is 280 dpi. Thus, it is required for the filter 10 to convert the data corresponding to 300 dpi output from the displacement correction circuit 9 into the data corresponding to 280 dpi. The filter 10 performs a process for filtering out some data from data output from the displacement correction circuit 9 at a rate of 0.93 (=280/300). However, there is a possibility that a simple filtering process causes problems such as the occurrence of moire fringes and the lack of information. The filter 10 selects signals corresponding to 7 lines among 100 lines at substantially equal intervals and outputs a signal having an average value between the selected signal and the subsequent signal instead of outputting the selected signal, thereby realizing a filtering ratio of 0.93 and overcoming the above-mentioned problems. The timing for outputting a signal having an average value of the selected signal and the subsequent signal is supplied to the filter 10 by the filter control circuit 13 as a select signal.

Figure 7:
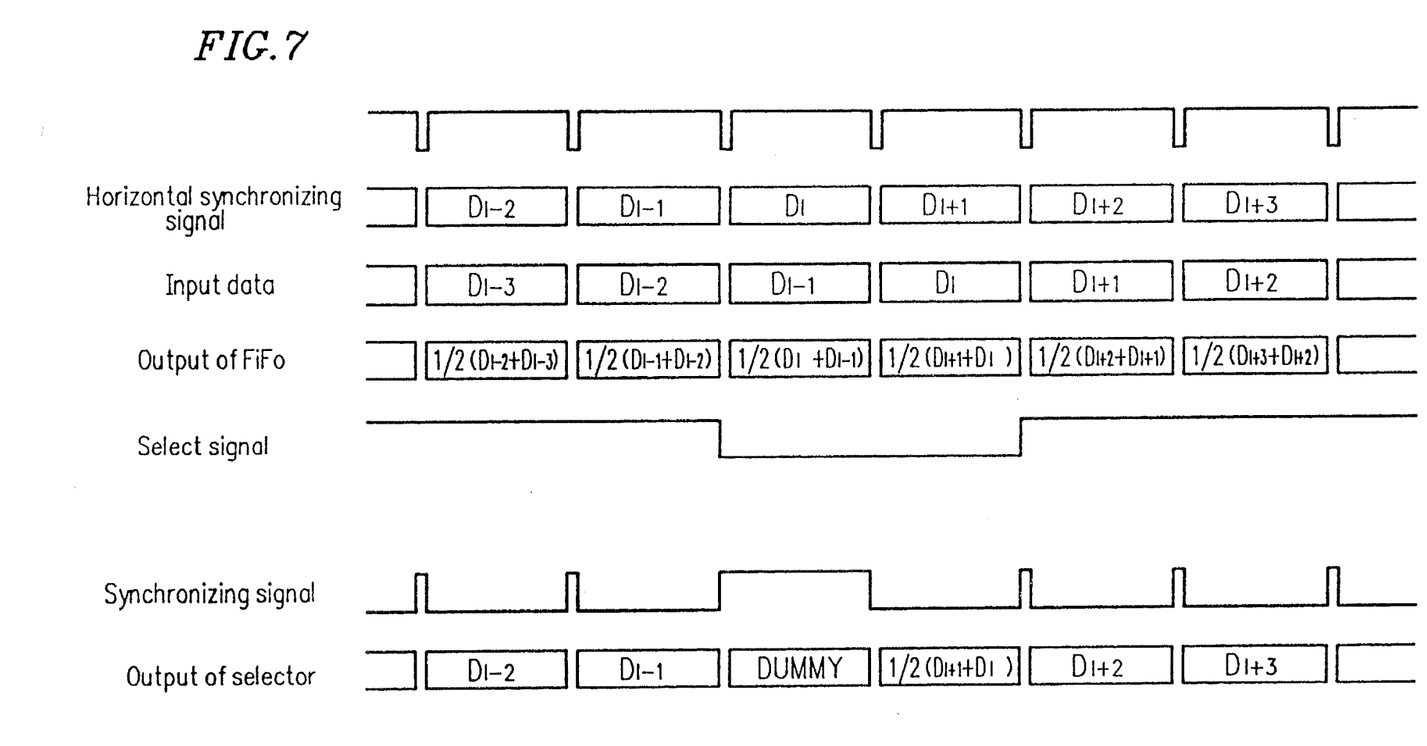
FIG. 7 is a diagram showing input/output timing of the filter circuit of the first example according to the present invention.

FIG. 7 is a timing diagram showing the timing when the filter control circuit 13 generates a select signal. The filter control circuit 13 has an adder (not shown) for accumulating the filtering ratios. os. The adder generates a select signal at a time when a carry from a decimal fraction to an integer fraction occurs. In the case where the filtering ratio is 0.93, the carry from the decimal fraction to the integer fraction occurs 7 in every 100 lines. In this manner, the filter 10 converts the data corresponding to 300 dpi into the data corresponding to 280 dpi.

As described above, the color image scanning apparatus of the first example is capable of outputting image data having arbitrary resolution without causing any color shift and lack of information, by being provided with a circuit for generating data having resolution higher than the desired resolution so as to satisfy the predetermined condition and a circuit for filtering the data thus generated at an appropriate ratio to output data having a desired resolution.

Next, a color image scanning apparatus of the second example according to the present invention will be described. The second example has the same construction as that of the first example. The second example is different from the first example in the operation of the sub-scanning speed determination circuit 12 and the filter control circuit 13.

Table 2 shows the relationship between the resolution corresponding to the magnification ratio of the original set by the operational panel 11 and the sub-scanning traveling pitch. The sub-scanning speed determination circuit 12 determines the sub-scanning traveling pitch so as to satisfy the following two conditions in accordance with Table 2.

(1) The distance between the respective line sensors is substantially equal to the integral multiple of a pitch per line at which the color image sensor 5 moves in the sub-scanning direction, regardless of the magnification ratio of the original set by the operational panel 11.

(2) Assuming that the resolution corresponding to the magnification ratio of the original set by the operational panel 11 is M, and the resolution corresponding to the sub-scanning traveling pitch determined by the sub-scanning speed determination circuit 12 is P, the relationship: $\frac{1}{2}P \leq M \leq \frac{2}{3}P$ is satisfied.

TABLE 2

| Resolution corresponding to a given magnification ratio (dpi) | Sub-scanning traveling pitch (μm) | Resolution corresponding to a sub-scanning traveling pitch (dpi) | Number of delay lines | |
|---|---|---|---|---|
| | | | Red | Green |
| 50 – 65 | 254.00 | 100 | 6 | 3 |
| 66 – 82 | 190.98 | 133 | 8 | 4 |
| 83 – 99 | 153.01 | 166 | 10 | 5 |
| 100 – 115 | 127.00 | 200 | 12 | 6 |
| 116 – 132 | 109.01 | 233 | 14 | 7 |
| 133 – 149 | 95.49 | 266 | 16 | 8 |
| 150 – 155 | 84.67 | 300 | 18 | 9 |
| 166 – 182 | 76.27 | 333 | 20 | 10 |

TABLE 2-continued

| Resolution corresponding to a given magnification ratio (dpi) | Sub-scanning traveling pitch (μm) | Resolution corresponding to a sub-scanning traveling pitch (dpi) | Number of delay lines | |
|---|---|---|---|---|
| | | | Red | Green |
| 183 – 199 | 69.39 | 366 | 22 | 11 |
| 200 – 215 | 63.50 | 400 | 24 | 12 |
| 216 – 232 | 58.66 | 433 | 26 | 13 |
| 233 – 249 | 54.62 | 466 | 28 | 14 |
| 250 – 265 | 50.80 | 500 | 30 | 15 |
| 266 – 282 | 47.65 | 533 | 32 | 16 |
| 283 – 299 | 44.87 | 566 | 34 | 17 |
| 300 – 315 | 42.33 | 600 | 36 | 18 |
| 316 – 332 | 40.13 | 633 | 38 | 19 |
| 333 – 349 | 38.14 | 666 | 40 | 20 |
| 350 – 365 | 36.29 | 700 | 42 | 21 |
| 366 – 382 | 34.65 | 733 | 44 | 22 |
| 383 – 399 | 33.16 | 766 | 46 | 23 |
| 400 – 800 | 31.75 | 800 | 48 | 24 |

For example, in the case where the magnification ratio of the original is set at 70% by the operational panel 11, the resolution of data to be actually output becomes 280 dpi (=400 dpi×0.7). In this case, the sub-scanning speed determination circuit 12 determines the sub-scanning traveling pitch to be 47.65 μm in accordance with Table 2 so that the pixel density becomes 533 dpi. A control signal indicating the sub-scanning traveling pitch determined by the sub-scanning speed determination circuit 12 is supplied to the driving circuit 6. The optical system 2 is driven by the driving circuit 6 in the sub-scanning direction at a speed of 47.65 μm/line.

In the case where the optical system 2 is driven in the sub-scanning direction at a speed of 47.65 μm/line, the data output from the displacement correction circuit 9 is data corresponding to 533 dpi. As described above, the resolution of data to be actually output is 280 dpi. Thus, it is required that the data corresponding to 533 dpi output from the displacement correction circuit 9 is converted into data corresponding to 280 dpi by the filter 10. The filter 10 receives a select signal from the filter control circuit 13 and performs a process for filtering out some data from the data output from the displacement correction circuit 9 at a rate of 0.525 (=280/533).

Figure 8:
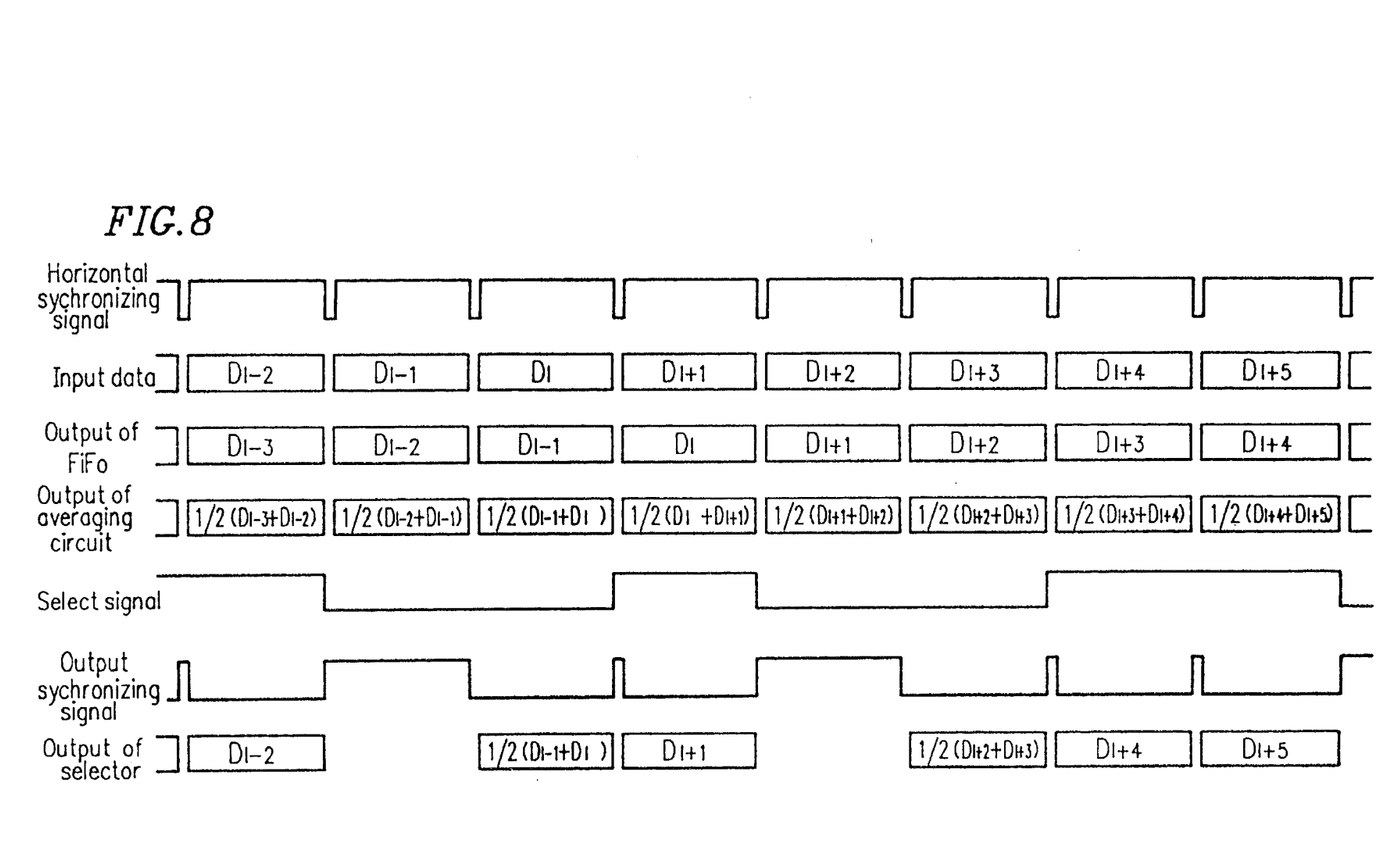
FIG. 8 is a diagram showing input/output timing of a filter circuit of the second example according to the present invention.

FIG. 8 is a timing diagram showing the timing when the filter control circuit 13 generates a select signal.

Accordingly, by determining the sub-scanning traveling pitch so as to satisfy the relationship: ½P≦M≦⅔P, the filtering ratio of the data in the filter circuit 10 can be made in the range of ½ to ⅔. Because of this, sloped lines and the like can be more smoothly reproduced.

Furthermore, in the same manner as in the first example, image data having arbitrary resolution can be output without generating color shift and lack of information.

In the above-mentioned description, it is assumed that three elements of color are R (Red), G (Green), and B (Blue). However, the present invention is not limited to the number and kinds of constituent elements of color. For example, other elements can be used as the three elements of color.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A color image scanning apparatus comprising:

an image sensor for scanning an original, the image sensor including a first line sensor, a second line sensor and a third line sensor arranged in a sub-scanning direction, the first line sensor converting a first component of an incident light into a first sensor signal, the second line sensor converting a second component of the incident light into a second sensor signal, the third line sensor converting a third component of the incident light into a third sensor signal;

determination means for determining speed for traveling the image sensor in the sub-scanning direction in accordance with a magnification ratio of the original;

driving means for driving the image sensor in the sub-scanning direction at the speed determined by the determination means;

correction means for correcting output timings of the first, second and third line sensors to output the first, second and third sensor signals corresponding to an identical position of the original;

filtering means for filtering each of the first, second and third sensor signals in accordance with the magnification ratio of the original and the speed determined by the determination means;

wherein the determination means determines the speed so that both a distance between the first line sensor and the second line sensor along the sub-scanning direction and a distance between the second line sensor and the third line sensor along the sub-scanning direction are substantially equal to an integral multiple of a traveling pitch per line at which the image sensor travels in the sub-scanning direction, regardless of the magnification ratio of the original.

2. A color image scanning apparatus according to claim 1, wherein the determination means determines the speed so as to satisfy the relationship: ½P≦M≦⅔P, where resolution corresponding to the magnification ratio of the original is M and resolution corresponding to the speed determined by the determination means is 3. A color image scanning apparatus according to claim 1, wherein the filtering means comprises:

storing means for storing data corresponding to one line;

calculating means for calculating per pixel an average value between data corresponding to a current line and data corresponding to one line before the current line; and selection means for selecting one of an output of the calculating means and the data corresponding to the current line.

4. A color image scanning apparatus according to claim 1, wherein the plurality of line sensors are formed on one chip, and color separation filters are respectively formed on the plurality of line sensors.

* * * * *